United States Patent [19]
Perlman et al.

[11] Patent Number: 6,055,316
[45] Date of Patent: Apr. 25, 2000

[54] SYSTEM AND METHOD FOR DERIVING AN APPROPRIATE INITIALIZATION VECTOR FOR SECURE COMMUNICATIONS

[75] Inventors: Radia J. Perlman, Acton; Stephen R. Hanna, Bedford, both of Mass.

[73] Assignee: Sun Microsystems, Inc., Palo Alto, Calif.

[21] Appl. No.: 08/998,520

[22] Filed: Dec. 26, 1997

[51] Int. Cl.[7] ........................................... H04L 9/00
[52] U.S. Cl. ............................................... 380/262
[58] Field of Search ................................ 380/29, 37, 48, 380/262

[56] References Cited

U.S. PATENT DOCUMENTS

| | | | |
|---|---|---|---|
| 4,322,576 | 3/1982 | Miller | 178/22.07 |
| 5,191,610 | 3/1993 | Hill et al. | 380/21 |
| 5,201,000 | 4/1993 | Matyas et al. | 380/30 |
| 5,420,928 | 5/1995 | Aiello et al. | 380/46 |
| 5,438,622 | 8/1995 | Normile et al. | 380/46 |
| 5,454,039 | 9/1995 | Coppersmith et al. | 380/28 |
| 5,479,513 | 12/1995 | Protopopescu et al. | 380/28 |
| 5,541,997 | 7/1996 | Pappas et al. | 380/49 |
| 5,664,017 | 9/1997 | Gressel et al. | 380/30 |
| 5,732,138 | 3/1998 | Noll et al. | 380/28 |
| 5,889,796 | 3/1999 | Whaley | 371/40.14 |

*Primary Examiner*—Gail O. Hayes
*Assistant Examiner*—Anthony DiLorenzo
*Attorney, Agent, or Firm*—Richard A. Jordan

[57] ABSTRACT

A secure communications arrangement is disclosed including a source device and a destination device interconnected by a network. The source device generates message packets for transfer to the destination device, each message packet including information in ciphertext form. The source device generates the ciphertext from plaintext in accordance with the cipher block chaining mode, using an initialization vector that is generated using a hash function selected so that small changes in an input result in large changes in the initialization vector. As a result values such as sequence numbers or time stamps can be used in generating the initialization vector, while still providing for cryptographic security for the ciphertext as against cryptanalytic attack. The destination device receives the message packet and decrypts the ciphertext to generate plaintext in accordance with the cipher block chaining mode, using an initialization vector that is generated using the corresponding hash function. Although the secure communications arrangement is described in connection with the cipher block chaining mode, other modes, such as the cipher-feedback mode, output-feedback mode and other encryption modes which make use of initialization vectors, could also be used.

87 Claims, 6 Drawing Sheets

SYSTEM AND METHOD FOR DERIVING AN APPROPRIATE INITIALIZATION VECTOR FOR SECURE COMMUNICATIONS

FIELD OF THE INVENTION

The invention relates generally to the field of communications, and more particularly to a system and method for deriving an appropriate initialization vector for use in encryption methodologies, such as the cipher block chaining mode, cipher-feedback mode, output-feedback mode and other encryption modes which make use of initialization vectors, for encrypting information to be communicated.

BACKGROUND OF THE INVENTION

Digital networks have been developed to facilitate the transfer of information, including data and programs, among digital computer systems and other digital devices. A variety of types of networks have been developed and implemented, including so-called "wide-area networks" (WANS) and "local area networks" (LANs), which transfer information using diverse information transfer methodologies. Generally, LANs are implemented over relatively small geographical areas, such as within an individual office facility or the like, for transferring information within a particular office, company or similar type of organization. On the other hand, WANs are implemented over relatively large geographical areas, and may be used to transfer information between LANs, between devices that are not connected to LANs, and the like. WANs also include public networks, such as the Internet, which can carry information for a number of companies.

A number of problems have arisen in connection with transfer of information over networks, particularly public networks. One significant problem is privacy, to ensure that, if information to be transferred from a source device to a destination device over the network is intercepted by a third device, the intercepting device cannot determine what the actual information is. Cryptographic techniques are used to address this problem. Generally, in such techniques, the information to be transferred, which is termed "plaintext," is encrypted using one of a plurality of encryption techniques by the source device. After encryption, the source device transfers the encrypted information, which is termed "ciphertext," to the destination device, which performs a decryption operation on the encrypted information to recover the plaintext.

A number of cryptographic techniques have been developed. In one technique, termed an "electronic codebook" mode, the plaintext information to be transferred is divided into a series of blocks, and each block is encrypted independently of the others to generate ciphertext blocks for transfer. Essentially, for each block $P_i$ of plaintext, an encrypted ciphertext block $C_i$ is formed using a encryption algorithm "E" and a particular encryption key "enc_key," that is, $C_i = E_{enc\_key}(P_i)$. When the destination device receives the ciphertext block $C_i$, it can regenerate the plaintext block $P_i$ using the appropriate decryption algorithm "D" and decryption key "dec_key," that is, $P = D_{dec\_key}(C_i)$. Depending on the particular encryption and decryption algorithms used, the values of the encryption key enc_key and decryption key dec_key may differ, or they may be the same.

A security problem arises in connection with use of the electronic codebook mode. Generally, for the same encryption algorithm and value of the encryption key enc_key, the same block of unencrypted information will always encrypt to the same encrypted information block. In many cases, messages transmitted from a particular source device or to a particular destination have fragments in common, such as headers transferred at the beginning of messages or footers at the end of messages. In addition, some types of messages, such as some types of electronic mail, have regular structures. In such cases, a cryptanalyst that intercepts such messages can mount statistical attacks which can provide information regarding the plaintext of the messages being transferred without knowing the particular encryption algorithm or the encryption key that were used in encrypting the messages.

This problem is addressed by use of a "cipher block chaining" mode. In cipher block chaining, information to be transferred is, like in the electronic codebook mode, encrypted in blocks, but each plaintext information block is, prior to encryption, pre-processed in connection with the ciphertext generated for the previous block. The pre-processed block is then encrypted for transmission. Thus, for each information block $P_i$ to be transferred, an encrypted information block $C_i$ is formed as $C_i = E_{enc\_key}(P_i \oplus C_{i-1})$, in which "$\oplus$" represents a predetermined pre-processing operation. Generally, the selected pre-processing operation "$\oplus$" used in the cipher block chaining mode is the bit-wise exclusive-OR operation. The first information block $P_1$ to be transferred is processed in connection with a block termed an "initialization vector," or "IV," which is also transferred to or otherwise known by the destination device. When the destination device receives the ciphertext block, it can regenerate the plaintext information block as $P_i = C_{i-1} \oplus D_{enc\_key}(C_i)$, with the initialization vector being used in connection with processing of the first encrypted information block $C_1$.

Generally, the cipher block chaining mode provides for more security than the electronic codebook mode, since, even if there is a significant degree of repetition among fragments of plaintext messages to be transferred, the pre-processing will generally ensure that the ciphertext itself does not repeat if different initialization vectors are used for the different message packets. Any values can be used as the initialization vector, such as random numbers. If the source device uses random numbers as the initialization vectors, it will need to provide the initialization vector to the destination device, either along with the message or separately (especially a value that must be sent for other purposes, such as a message sequence number), which the destination device can use in generating the unencrypted information block.

However, in some situations there is no room in the message for the initialization vector, or it may otherwise be inconvenient to transfer the initialization vector to the destination device. In such situations it is often desired to use a value as the initialization vector that is either sent as plaintext along with the message, or a value that is otherwise known to or inferrable or derivable by the destination device and which need not be transferred, such as a message sequence number, time stamp, or the like. A problem arises in connection with use of such values as an initialization vector. Often, if values such as packet sequence numbers or time stamps are used as the initialization vector, the values will not change significantly from one message to the next, and so the pre-processed plaintext processed with such initialization vectors also will not change significantly from one message to the next. With some types of encryption algorithms, a cryptanalyst, who intercepts message packets containing ciphertext which was encrypted with such algorithms, can successfully use well-known "differential cryptanalysis" techniques when the information being encrypted (in this case, the pre-processed plaintext) for successive messages differs in only a few bits, to recover information about the information being transferred. Accordingly, it is generally not considered good security practice to use information such as a packet sequence number or time stamp as the initialization vector, even though it is guaranteed to be different in every message.

SUMMARY OF THE INVENTION

The invention provides a new and improved communications system and method for providing a secure communications channel, and more particularly a new and improved system and method for deriving an appropriate initialization vector for use in encryption methodologies, such as the cipher block chaining mode, cipher-feedback mode, output-feedback mode and other encryption modes which make use of initialization vectors, for encrypting information to be communicated.

In brief summary, the invention provides in one aspect a ciphertext information generating system and method for generating ciphertext from plaintext. The ciphertext information generating system comprises an initialization vector generator and an encryption module. The initialization vector generator is configured to receive a selected input value and generate an initialization vector therefrom using a selected initialization vector generation methodology. The selected input value used in generating the initialization vector is different for each plaintext and may comprise, for example, a sequence number or a time stamp. The selected initialization vector generation methodology is selected so that (a) a small change of the selected input value will result in a large change in the initialization vector; and (b) for any two randomly-selected selected input values, it is unlikely that the corresponding initialization vectors will have the same value.

The encryption module is configured to generate the ciphertext from the plaintext and the initialization vector in accordance with a selected encryption methodology and encryption key. In one embodiment, a hashing methodology, such as the MD5 hashing methodology is used as the selected initialization vector generation methodology.

By ensuring that small changes in the selected input values used in generating initialization vectors for successive plaintexts result in large changes in the initialization vector, values such as the sequence number or time stamp, which normally may not change by a very large amount for successive ciphertexts, may be conveniently used in generating the initialization vector, and still provide an acceptable degree of security.

In another aspect, the invention provides a plaintext information generating system and method for generating plaintext from ciphertext. The plaintext information generating system comprises an initialization vector generator and a decryption module. The initialization vector generator is configured to receive a selected input value and generate an initialization vector therefrom using a selected initialization vector generation methodology. The selected input value used in generating the initialization vector is different for each ciphertext, and may comprise, for example, a sequence number or a time stamp. The selected initialization vector generation methodology is selected so that (a) a small change of the selected input value will result in a large change in the initialization vector; and (b) for any two randomly-selected selected input values, it is unlikely that the corresponding initialization vectors will have the same value.

The decryption module is configured to generate the plaintext from the ciphertext and the initialization vector in accordance with a selected decryption methodology and decryption key. In one embodiment, a hashing methodology, such as the MD5 hashing methodology is used as the selected initialization vector generation methodology.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
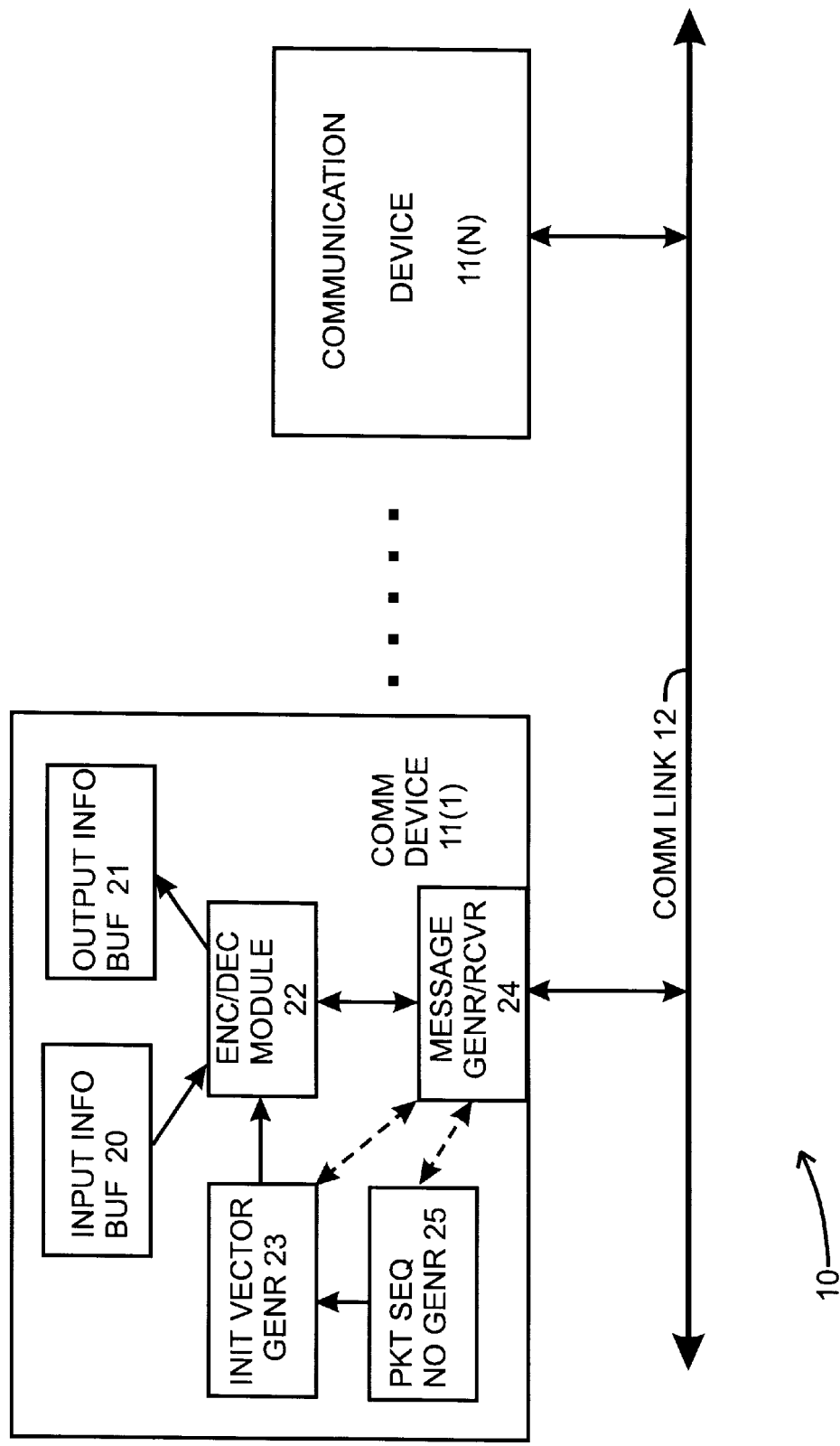
FIG. 1 is a functional block diagram of a communication system, including a plurality of communication devices which provide a secure communication channel in accordance with the invention.

FIG. 1 is a functional block diagram of a communication system 10, including a plurality of communication devices 11(1) through 11(N) (generally identified by reference numeral 11(n)) interconnected by a network represented in FIG. 1 by communication link 12. The communication devices 11(n) may comprise any of a number of types of devices which may engage in communications over the network, including, for example, computers (including personal computers, workstations, and mini- and mainframe computers), mass storage subsystems, network interfaces and other elements for generating and using data, whether in digital form or otherwise.

The network may comprise a local area network (LAN), a public or private wide area network (WAN), a network such as the Internet or public telephony network, or any combination of such networks. As is conventional, the network includes a communications medium over which the communication devices 11(n) communicate, which can include, for example, wires, optical fibers or other media for carrying signals representing information among the communication devices.

The devices 11(n) communicate with each other in the form of message packets that are transferred over communication link 12. During such communications, information is transferred in encrypted form in the message packets that are transferred from one communication device 11(n), as a source device 1($n_s$) (subscript "S" indicating the source device), to the other communication device 11(n'), as a destination device $11(n_D)$ (subscript "D" indicating the destination device) over the communication link 13. The communication devices $11(n)$ and $(n')$ may communicate bidirectionally, in which case the communication device $11(n')$ may also operate as a source device to transfer message packets to the communication device $11(n)$ operating as a destination device. In any case, the respective source device $11(n_s)$ uses the cipher block chaining mode with any convenient encryption algorithm and encryption key to generate the message packet, as will be described below in connection with FIG. 2, from the plaintext information to be transferred. The destination device $11(n_D)$ receives the message packet and, using the cipher block chaining mode with the appropriate decryption algorithm and decryption key, will regenerate the plaintext information, as will be described below in connection with FIG. 3.

One communication device, namely, communication device 11(1), is shown in detail in FIG. 1, and other communication devices $11(n)$ may be structured similarly. As shown in FIG. 1, the communication device 11(1) includes an information input buffer 20, an information output buffer 21, an encrypt/decrypt module 22, an initialization vector generator 23, a message generator/receiver 24 and a packet sequence number generator 25. The information input buffer 20 receives information, in plaintext form, that is to be transferred to another communication device $11(n)$ (n≠1) over the communication link 12, with the communication device 11(1) operating as a source device. The plaintext information may be generated by and/or otherwise provided to the information input buffer 20 by other components (not shown). The packet sequence number generator 25 generates a packet sequence number for a message packet in which the information, after being encrypted, will be transferred to another communication device $11(n)$ (n≠1) over the communication link 12. The initialization vector generator 23 receives the packet sequence number from the packet sequence number generator 25 and generates therefrom an initialization vector.

The encrypt/decrypt module 22 receives the information from the information input buffer 20 and the initialization vector generated by the initialization vector generator 23 and performs an encryption operation in connection therewith to generate ciphertext information that is provided to the message generator/receiver 24. In performing the encryption, the encrypt/decrypt module 22 operates in accordance with the cipher block chaining mode using any convenient encryption algorithm and encryption key. The message generator/receiver 24, in turn, receives the ciphertext information and generates a message packet including the ciphertext and transmits it (that is, the message packet) over the communication link 12. The message packet generated by message generator/receiver 24 may have any of a number of packet formats as may be required for the network; if the packet format permits or requires that the packet sequence number be included in the packet, the message generator/receiver 24 may or will also receive the packet sequence number from the packet sequence number generator 25 for inclusion in the message packet.

The message generator/receiver 24 also receives message packets from the communication link 12 which are transmitted to the communication device 11(1) by other communication devices $11(n)$ (n≠1) operating as source devices. In that connection, the communication device 11(1) will be operating as a destination device. In such an operation, the message generator/receiver 24 receives the message packet and provides the information from the message, which is in ciphertext, to the encrypt/decrypt module 22 for decryption. In addition, if the message packet contains the packet sequence number, the encrypt/decrypt module 22 provides that packet sequence number to the initialization vector generator 23; otherwise, the packet sequence number generator 25 will also generate a packet sequence number for the received message packet for provision to the initialization vector generator 23. In any case, the initialization vector generator 23 will generate from the packet sequence number an initialization vector for provision to the encrypt/decrypt module 22.

The encrypt/decrypt module 22 receives the information in ciphertext form from the message generator/receiver 24 and the initialization vector from the initialization vector 23 and generates therefrom decrypted information, that is, information in plaintext form, for storage in the output information buffer 21. In decrypting the ciphertext information, the encrypt/decrypt module 22 will use a decryption algorithm and decryption key that is appropriate for the encryption algorithm and encryption key that were used by the source device $11(n)$ (n≠1) in generating the ciphertext information. After the plaintext information is stored in the output information buffer 21, it may be provided to and used by other components (not shown) for storage, processing and/or other operations.

Figure 2:
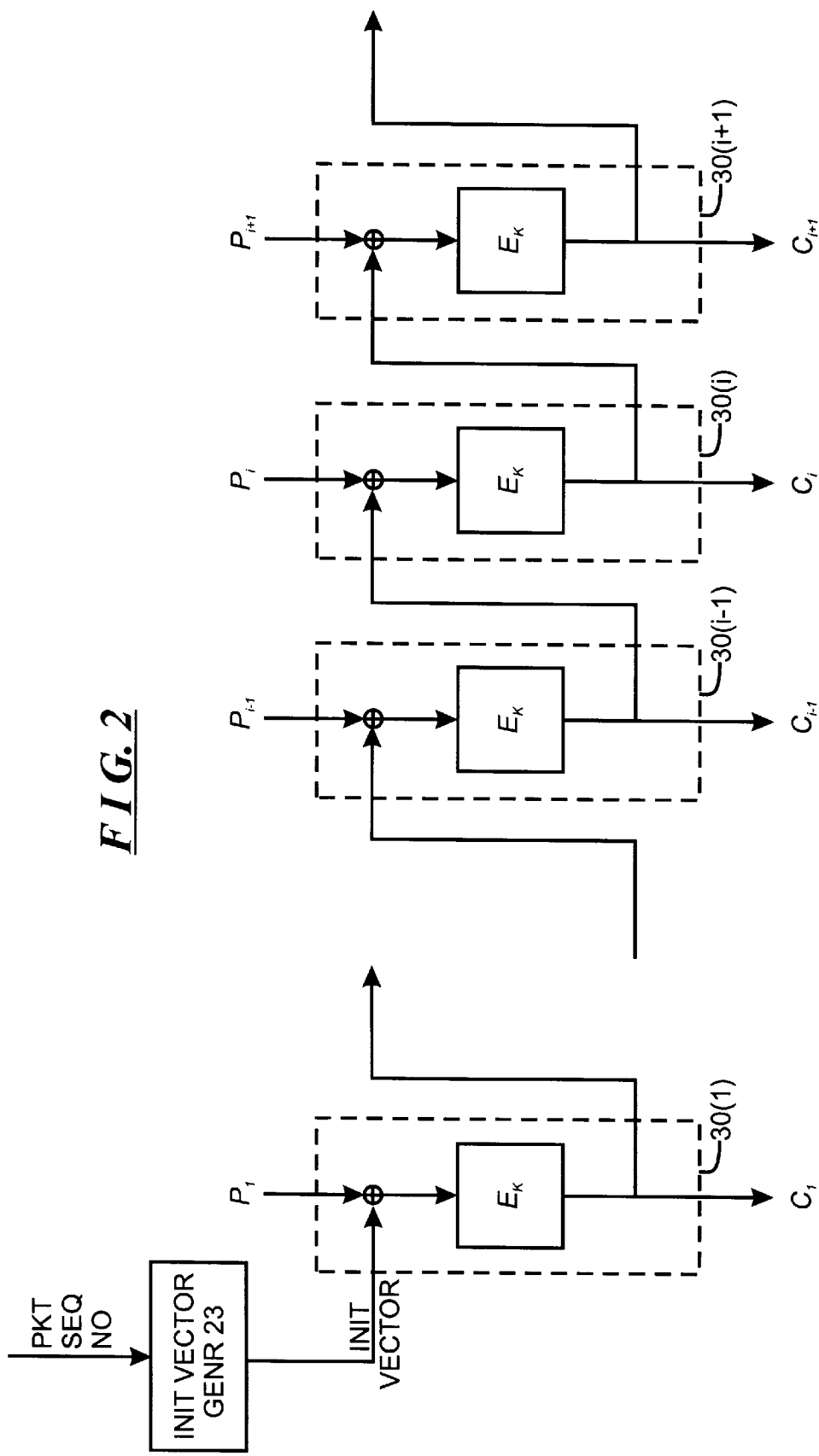
FIG. 2 schematically depicts operations performed by the communication devices in encrypting plaintext information using the cipher block chaining mode in accordance with the invention to generate ciphertext information for transfer in message packets over the communication channel.
Figure 3:
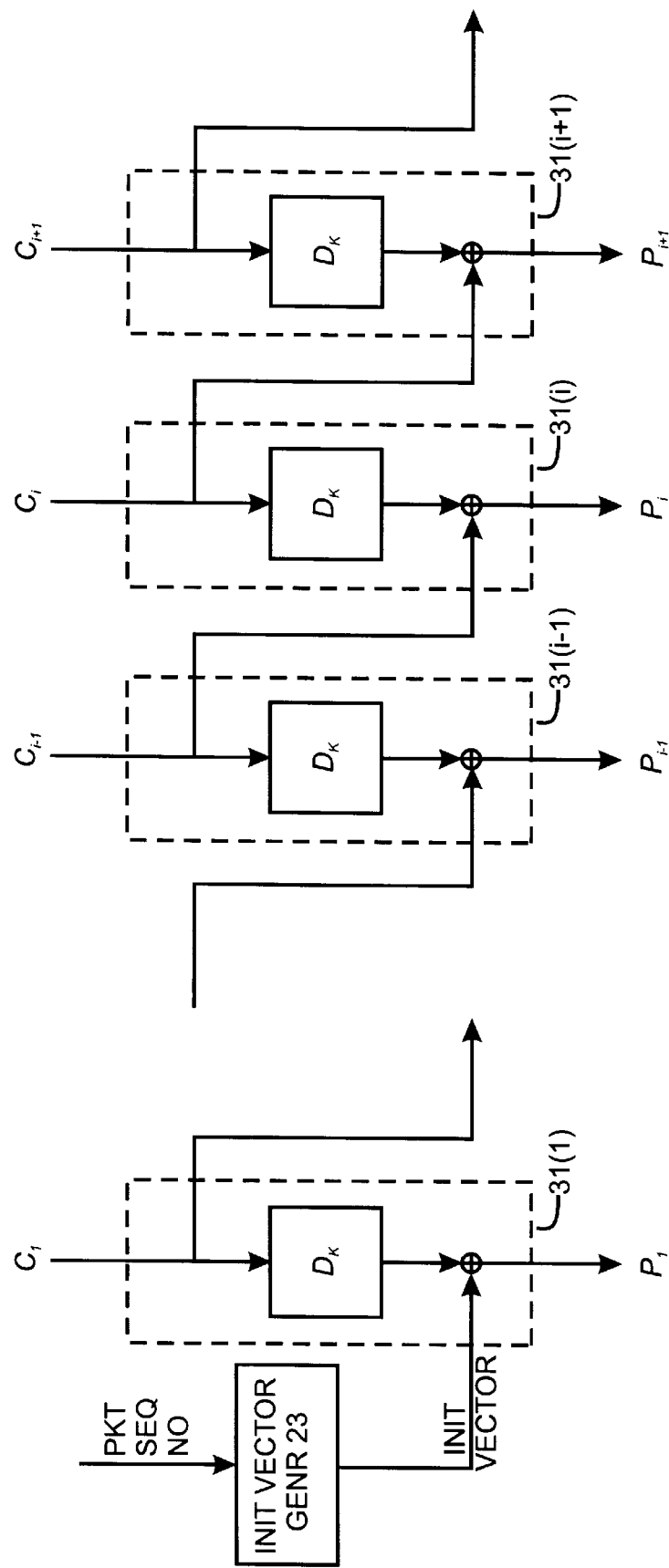
FIG. 3 schematically depicts operations performed by the communication devices in decrypting ciphertext information received in message packets over the communication link, using the cipher block chaining mode in accordance with the invention, to generate plaintext information.

Before proceeding further, it would be helpful to describe the operations performed by the encrypt/decrypt module 22 and the initialization vector generator 23 in more detail. FIG. 2 schematically depicts operations performed by the encrypt/decrypt module 22 and initialization vector generator 23 in connection with encrypting of the plaintext information to generate ciphertext information for transfer over the communication link 12, and FIG. 3 schematically depicts operations performed by the encrypt/decrypt module 22 and initialization vector generator 23 in connection with decrypting of the ciphertext information received over the communication link 12 to generate plaintext information. With reference initially to FIG. 2, and in accordance with the cipher block mode, the encrypt/decrypt module 22 divides the plaintext information into a series of blocks $P_i$, $P_2$, . . . (generally $P_i$) and performs encryption in a series of stages, each stage being identified by a reference numeral $30(i)$, to generate a ciphertext block $C_i$. The encrypt/decrypt module 22 provides the series of ciphertext blocks $C_1$, $C_2$, . . . (generally $C_i$) to the message generator/receiver 24 for transmission as described above. In each stage $30(i)$, the encrypt/decrypt module 22 initially performs a bit-wise exclusive-OR operation, represented in FIG. 2 by "⊕," in connection with the plaintext block $P_i$ and the ciphertext block $C_{i-1}$ generated by the previous stage $30(i-1)$. The result of the exclusive-OR operation are then encrypted using a selected encryption algorithm "E" and encryption key, represented in FIG. 2 by "K," to generate the ciphertext block $C_i$ for the stage $30(i)$. Thus, for the plaintext block $P_i$, the ciphertext block $C_i$ is generated as $C_i=E_K(P_i \oplus C_{i-1})$, where "K" represents the encryption key. For the first stage 30(1), in which the plaintext block $P_i$ is encrypted, the initialization vector "INIT_VECTOR," provided by the initialization vector generator 23, is used in the exclusive-OR operation.

With reference to FIG. 3, to decrypt the ciphertext received by the message generator/receiver 24, the encrypt/decrypt module 22 divides the received ciphertext information into a series of blocks $C_i$, $C_2$, . . . (generally $C_i$) and performs decryption in a series of stages, each stage being identified by a reference numeral $31(i)$, to generate a plaintext block $P_i$. In each stage $31(i)$, the encrypt/decrypt module 22 initially performs a decryption operation using the appropriate decryption algorithm "D" and decryption key, represented in FIG. 3 by "K." Thereafter, the stage 31(i) performs a bit-wise exclusive-OR operation in connection with the results of the decryption and the previous ciphertext block in the series $C_{i-1}$ to generate the plaintext block $P_i$ for the stage 31(i). Thus, for the ciphertext block $C_i$, the plaintext block $P_i$ is generated as $P_i = C_{i-1} \oplus D_K(C_i)$, where "K" represents the decryption key. For the first stage 30(1), in which the ciphertext block $C_1$ is encrypted, the initialization vector "INIT_VECTOR," provided by the initialization vector generator 23, is used in the exclusive-OR operation.

As noted above, the initialization vector generator 23 in both encryption (FIG. 2) and decryption (FIG. 3) generates an initialization vector for use by the encrypt/decrypt module 22 from the packet sequence number provided thereto by the packet sequence number generator 25 or the message generator/receiver 24. Typically, the packet sequence number is incremented by a predetermined value, typically "one," for successive message packets that are transmitted to a particular destination device during, for example, a communications session between the destination device and a particular source device. Thus, assuming that all packets transmitted by the source device are received by the destination device in order, the destination device will itself be able to generate, for each message packet transferred by the source device, the packet sequence number for the respective packet. In such cases, the source device would not need to provide the packet sequence number to the destination device. However, if message packets may be dropped or be received by the destination device out of order, preferably the source device will provide the packet sequence number for each message packet to the destination device, either in the message packet or separately. In any case, if packet sequence numbers for successive message packets are incremented by "one," in the binary representation for the sequence number generally only a few bits in the sequence number will change from one message packet to the next. For at least some encryption algorithms "E," if the initialization vector generator 23 were to provide the packet sequence number PKT_SEQ_NO as the initialization vector INIT_VECTOR, differential cryptanalysis techniques may be useful in generating information, particularly key information, from the resulting ciphertexts, particularly if first one or several plaintext blocks $P_1, P_2, \ldots$ are the same or similar as among the plaintext information to be transferred in successive message packets.

In accordance with the invention, instead of providing the packet sequence number PKT_SEQ_NO to the encrypt/decrypt module 22 as the initialization vector INIT_VECTOR, the initialization vector generator 23 processes the packet sequence number PKT_SEQ_NO in accordance with a selected hash function to generate a hashed packet sequence number, which the initialization vector generator 23 provides to the encrypt/decrypt module 22 as the initialization vector INIT_VECTOR. Preferably, the hash function selected for use by the initialization vector generator has the following characteristics:

(i) if the packet sequence number changes by a small value, such as "one," a large number of bits of the binary representation of the "hashed" packet sequence number (that is, the value of the result of the hash function as applied to the packet sequence number) will change, and (ii) for any two randomly-selected packet sequence numbers, it is unlikely that the corresponding hashed packet sequence numbers will have the same value.

With respect to characteristic (i), it is preferred that the hash function be selected so as to ensure that at least one-half of the bits of the binary representation of the hashed packet sequence number be change if the packet sequence number changes by the small value. One hash function that has these characteristics (i) and (ii) is the well-known MD-5 hash function. It will be appreciated that characteristic (i) will ensure that, for successive values of the packet sequence number PKT_SEQ_NO provided by the packet sequence number generator 25, for which only a small number of bits of the binary representations will change, in the initialization vectors INIT_VECTOR generated by the initialization vector generator 23 a large number of bits will change. This will substantially reduce the likelihood that differential cryptanalytic techniques can successfully be used. It will further be appreciated that the initialization vector generator 23 in both the source and destination devices $11(n_s)$ and $11(n_D)$ will need to use the same hashing algorithm so that both will generate the same initialization vector INIT_VECTOR for encrypting the plaintext to generate the ciphertext (in the case of the source device) and decrypting the ciphertext (in the case of the destination device).

Figure 4:
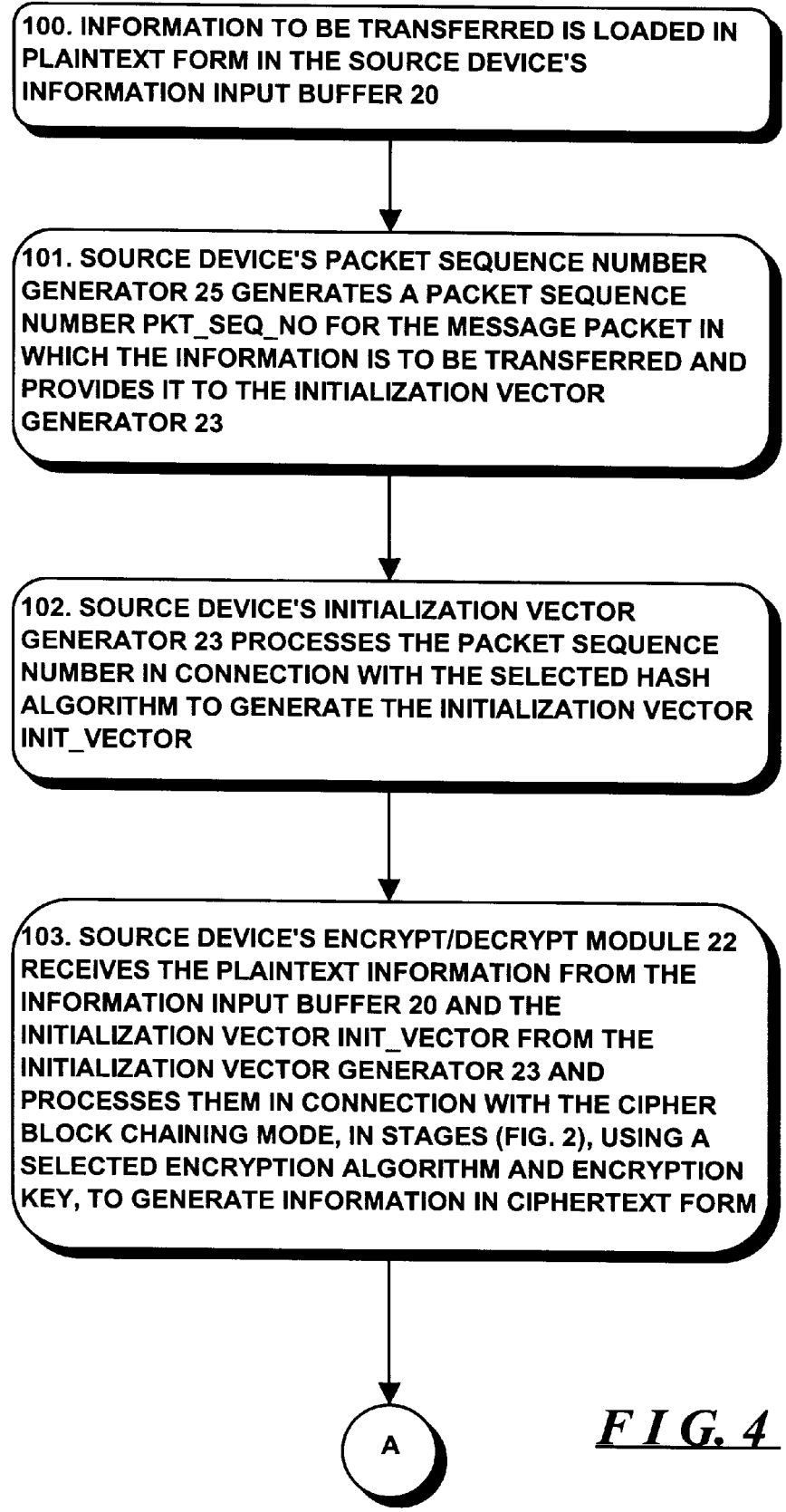
FIGS. 4, 4A, and 4B depict a flowchart useful in understanding the operations performed by the communication devices in generating and transferring message packets in the system depicted in FIG. 1.
Figure 4A:
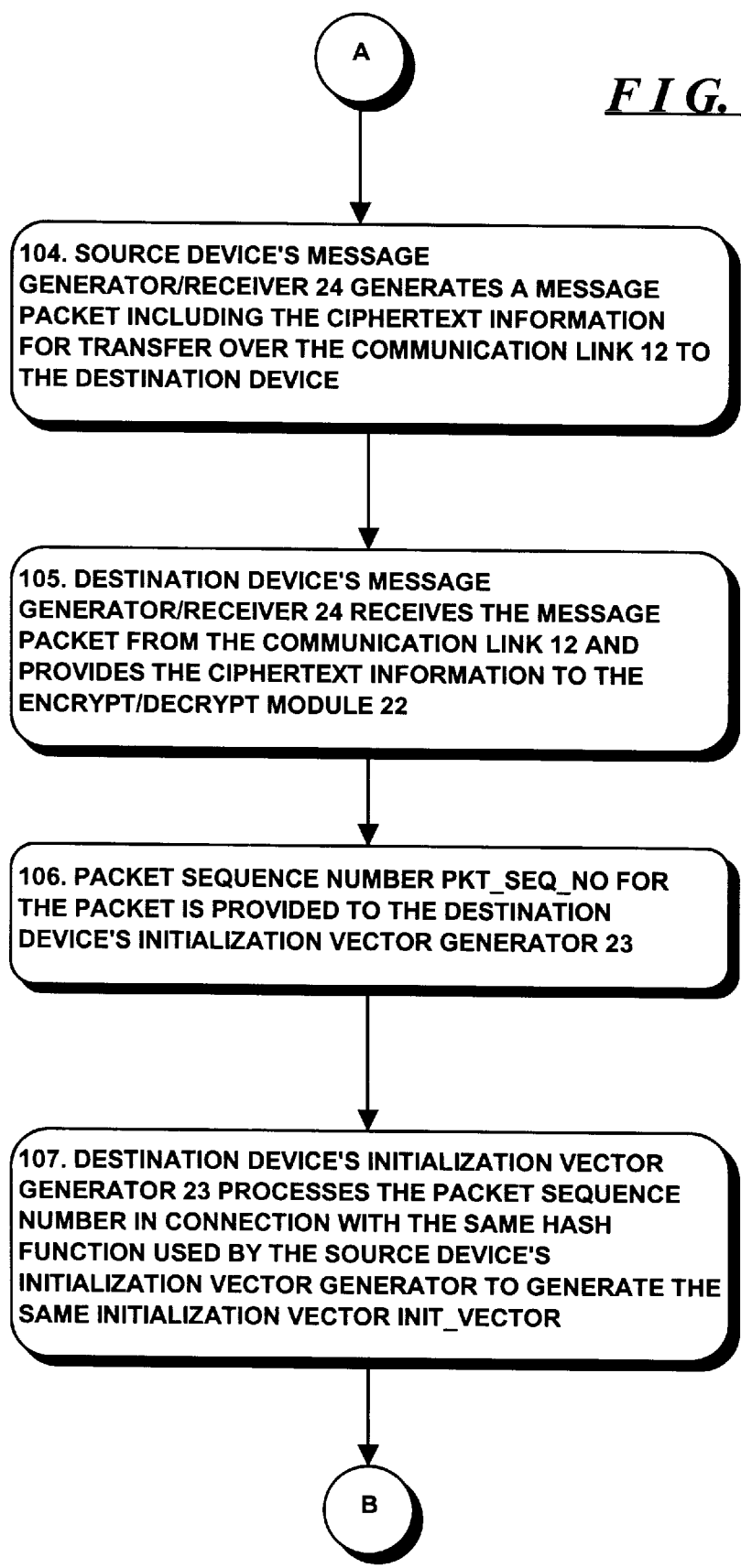
Figure 4B:
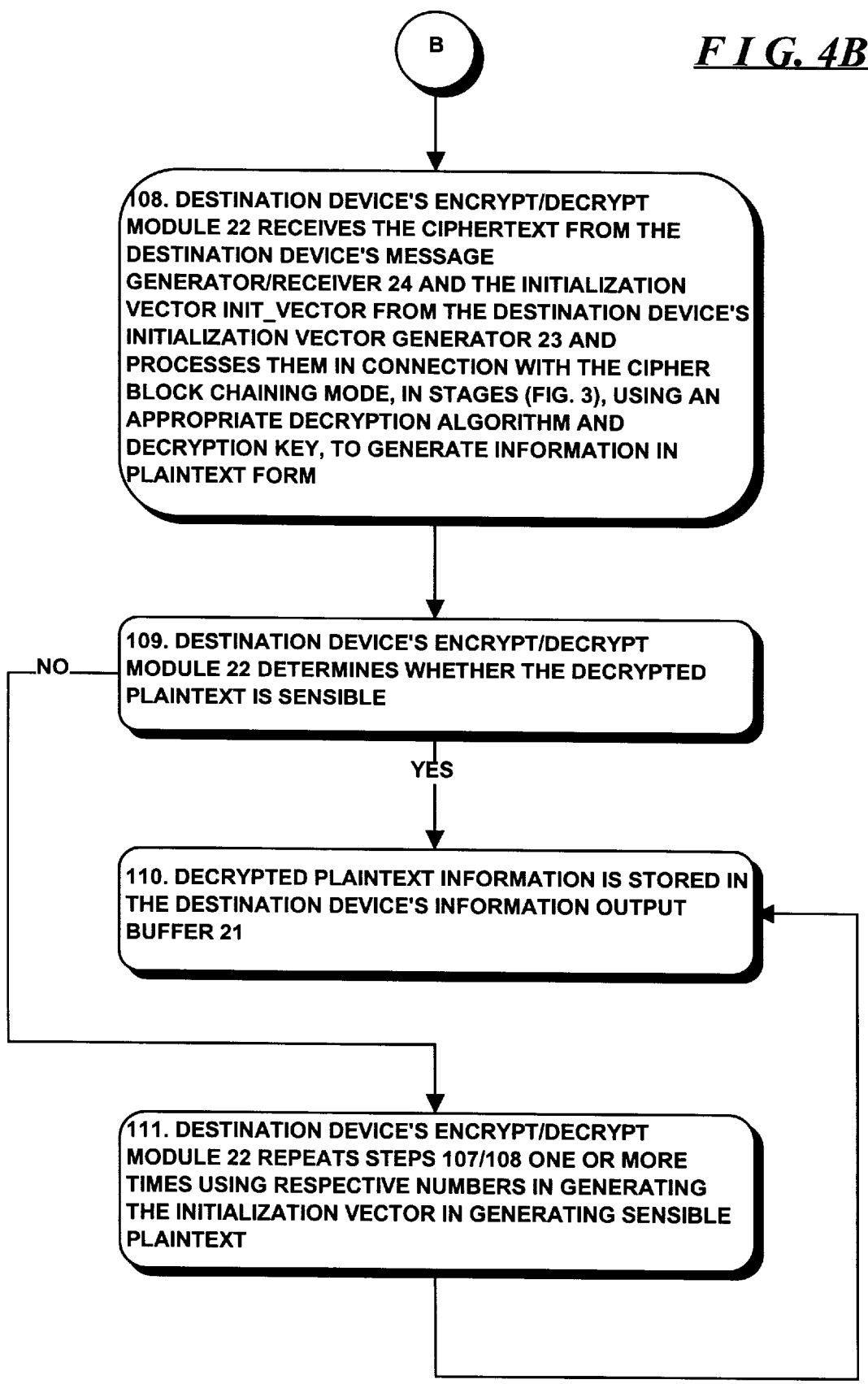

Operations performed by a source device and a destination device in transferring information will be described in connection with the flowchart depicted in FIG. 4. With reference to FIG. 4, the information to be transferred in a message packet is loaded in plaintext form in the information input buffer 20 of the source device (step 100). The packet sequence number generator 25 generates a packet sequence number PKT_SEQ_NO for the message packet in which the information is to be transferred and provides it to the initialization vector generator 23 (step 101), which processes the packet sequence number in connection with the selected hash algorithm to generate the initialization vector INIT_VECTOR (step 102). The encrypt/decrypt module 22 receives the plaintext information from the information input buffer 20 and the initialization vector INIT_VECTOR from the initialization vector generator 23 and processes them in connection with the cipher block chaining mode, in stages as described above in connection with FIG. 2, using a selected encryption algorithm and encryption key, to generate information in ciphertext form (step 103). The ciphertext information is provided to the message generator/receiver 24, which generates a message packet including the ciphertext information for transfer over the communication link 12 to the destination device (step 104).

The destination device's message generator/receiver 24 receives the message packet from the communication link 12 and provides the ciphertext information to the encrypt/decrypt module 22 (step 105). In addition, a packet sequence number PKT_SEQ_NO for the packet is provided to the destination device's initialization vector generator 23 (step 106), either by, for example, the packet sequence number generator 25 or the message generator/receiver 24. The initialization vector generator 23 processes the packet sequence number in connection with the same hash function used by the source device's initialization vector generator to generate the same initialization vector INIT_VECTOR (step 107), which it provides to the destination device's encrypt/decrypt module 22. The destination device's encrypt/decrypt module 22 receives both the ciphertext from the destination device's message generator/receiver 24 and the initialization vector INIT_VECTOR from the destination device's initialization vector generator 23 and processes them in connection with the cipher block chaining mode, in stages as described above in connection with FIG. 3, using an appropriate decryption algorithm and decryption key, to generate information in plaintext form (step 108). Thereafter, the destination device $11(n_D)$ may perform a plaintext verification step (step 109), as will be described below, to verify that the plaintext is sensible. If the destination device $11(n_D)$ makes a positive determination in step 109, it can store the plaintext in the destination device's information output buffer 21 (step 110).

If, on the other hand, the destination device $11(n_D)$ makes a negative determination in step 109, that is, if it determines that the plaintext is not sensible, as will be described below, the packet sequence number PKT_SEQ_NO that was used in generating the initialization vector was not the correct packet sequence number. This may occur if, for example, a message packet was lost or the message packet was received out of order. In that case, the destination device $11(n_D)$ can repeat steps 107 and 108, using one or more other numbers as assumed packet sequence numbers in generating respective initialization vector(s), decrypt the ciphertext using the respective initialization vector(s) to generate respective plaintext(s), and determine a sensible one of the plaintext(s) so generated as the correct plaintext (step 111). Techniques that the destination device $11(n_D)$ can use in connection with step 109 will be described below.

The invention provides a number of benefits. In particular, it provides a communications system over which information is transmitted in message packets, the information being encrypted in accordance with the cipher block chaining mode, and that further reduces the likelihood that differential cryptanalysis techniques can successfully be used to overcome the encryption even if initialization vectors are used which are based on information, such as packet sequence numbers or time stamps, which will generally not change substantially for successive message packets.

It will be appreciated that a number of changes and modifications may be made to the system as described above. For example, although the invention has been described in connection with use of the cipher block chaining mode, it will be appreciated that a system and devices in accordance with the invention can make use of other encryption/decryption modes, such as the output-feedback mode, cipher-feedback mode, and other modes which make use of an initialization vector.

Furthermore, although the communication devices $11(n)$ have been described as providing bi-directional communications therebetween, it will be appreciated that at least some of the communications devices $11(n)$ may provide for only unidirectional communications. In that case, if a communication device $11(n)$ only operates as a source device, it would not need to include an information output buffer 21. In addition, the message generator/receiver module 24 would only need to be able to transmit message packets and the encrypt/decrypt module 22 would only need to be able to encrypt the plaintext information. On the other hand, if a communication device only operates as a destination device, it would not need to include an information input buffer 20. In addition, the encrypt/decrypt module 22 would only need to be able to decrypt message packets and the message generator/receiver module 24 would only need to be able to receive message packets.

In addition, it will be appreciated that the invention can also be used in connection with a wide variety of communications systems, including systems in which information is not just transferred spatially, as is the case in system 10 as described above, but also or instead temporally. In that case, for example, information may be stored on, for example, a storage medium, such as a magnetic disk or tape, for later retrieval by the same device that stored the information, or by a different device. The information is stored in encrypted form generated using the cipher block chaining mode and any convenient encryption algorithm and encryption key in the same manner as described above, and further using a hashed value as the initialization vector. In this case, the value that is hashed for use as the initialization vector may be, for example, a value that corresponds or is otherwise related to the storage address or location of the information on the storage medium, and therefore need not be stored with the ciphertext. Other suitable values will be apparent to those skilled in the art.

Furthermore, although system 10 has been described as using packet sequence numbers in generating the initialization vector INIT_VECTOR, it will be appreciated that other information can be used, such as, for example, time stamps associated with the point in time at which the message packet is generated. If a time stamp is used, a small sequence number may also be used along with the time stamp to guarantee that unique initialization vectors are generated. Alternatively, the technique described in the next paragraph may be used to eliminate any need for the sequence number.

As noted above, the source device $11(n_S)$ may provide to the destination device $11(n_D)$ the packet sequence number from which it generated the initialization vector INIT_VECTOR that was used in encrypting the plaintext in the message packet associated with the packet sequence number. However, in some cases it is not possible or desirable to provide the packet sequence number. If the message packets are transferred reliably (that is, if message packets are not lost) and in order, the destination device will be able to determine the packet sequence number and, using the same hash function as was used by the source device, generate the initialization vector INIT_VECTOR for use in decryption.

However, as also noted above, if a message packet is lost and not received by the destination device, or if a message packet is received by the destination device out of order, the packet sequence number that the destination device assumes for the message packet will be incorrect. This can be accommodated by having the destination device assume that the packet sequence number is one of several numbers close to the packet sequence number associated with a previous correctly-received message packet, and decrypt the ciphertext in the message packet using one or more initialization vectors each generated from a respective one of those numbers. The result of this operation is to generate one or more plaintexts, one for each initialization vector so generated. Thereafter, the destination device can examine each plaintext so generated to determine whether the respective plaintext is sensible, and select the plaintext that is sensible or that appears to be most sensible as the properly decrypted plaintext.

Several techniques can be used to determine which plaintext is the one sensible decryption of the ciphertext, or which plaintext appears to be the most sensible decryption of the ciphertext. For example, a checksum, digital signature or the like that is based on the plaintext may be provided in or otherwise associated with the message packet; in that case, the destination device can determine that a decrypted plaintext is sensible if its checksum, digital signature, etc., corresponds to that provided in or associated with the message packet. Alternatively or in addition, information as to the application which generated or is to receive the plaintext may be used. For example, if it is known that the plaintext is in ASCII text form, the destination device can determine that a particular decrypted plaintext is sensible by checking that the high-order bit of each decrypted byte of the plaintext has the value "zero." Other techniques will be apparent to those skilled in the art. The destination device $11(n_D)$ can decrypt the ciphertext received in a message packet as described above one or more times using respective numbers as the assumed packet sequence number until it generates a plaintext that it determines to be sensible, or it can decrypt the ciphertext a plurality of times using respective numbers as the assumed packet sequence number and determine which plaintext so generated it determines to be the most sensible.

Similar operations can be used if a time stamp is used in generating the initialization vector.

It will be appreciated that, in most cases, message packets will be delivered reliably (that is, message packets will not be lost) and in order, in which case generally the correct packet sequence number associated with a message packet will be the next packet sequence number after the packet sequence number associated with the previous correctly-received message packet.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A ciphertext information generating system for generating ciphertext from plaintext, said ciphertext information generating system comprising:
   A. an initialization vector generator configured to receive a selected input value and generate an initialization vector therefrom using a selected initialization vector generation methodology,
      (i) the selected input value being different for each plaintext and being associated with a selected characteristic of said plaintext,
      (ii) the selected initialization vector generation methodology being selected so that
         (a) a small change of the selected input value will result in a large change in the initialization vector; and
         (b) for any two randomly-selected selected input values, it is unlikely that the corresponding initialization vectors will have the same value; and
   B. an encryption module configured to generate the ciphertext from the plaintext and the initialization vector using a selected encryption methodology and encryption key.

2. A ciphertext information generating system as defined in claim 1 in which the selected initialization vector generation methodology is a hashing methodology.

3. A ciphertext information generating system as defined in claim 2 in which the selected initialization vector generation methodology is an MD5 hashing methodology.

4. A ciphertext information generating system as defined in claim 1 in which the selected characteristic is a ciphertext sequence number.

5. A ciphertext information generating system as defined in claim 1 in which the selected characteristic is a time stamp.

6. A ciphertext information generating system as defined in claim 1 further including a ciphertext information utilization module configured to utilize the ciphertext.

7. A ciphertext information generating system as defined in claim 6 in which the ciphertext information utilization module comprises a message packet transfer module configured to generate a message packet including the ciphertext for transfer over a network.

8. A ciphertext information generating system as defined in claim 7 in which the message packet transfer module is further configured to associate the selected input value with the message packet.

9. A ciphertext information generating system as defined in claim 6 in which the ciphertext information utilization module comprises an information store for storing the ciphertext.

10. A ciphertext information generating system as defined in claim 9 in which the initialization vector generator is configured to use a storage address in the information store as the input number.

11. A plaintext information generating system for generating plaintext from ciphertext, said plaintext information generating system comprising:
    A. an initialization vector generator configured to receive a selected input value and generate an initialization vector therefrom using a selected initialization vector generation methodology,
       (i) the selected input value being different for each plaintext and being associated with a selected characteristic of said ciphertext,
       (ii) the selected initialization vector generation methodology being selected so that
          (a) a small change of the selected input value will result in a large change in the initialization vector; and
          (b) for any two randomly-selected selected input values, it is unlikely that the corresponding initialization vectors will have the same value; and
    B. a decryption module configured to generate the plaintext from the ciphertext and the initialization vector using a selected decryption methodology and decryption key.

12. A plaintext information generating system as defined in claim 11 in which the selected initialization vector generation methodology is a hashing methodology.

13. A plaintext information generating system as defined in claim 12 in which the selected initialization vector generation methodology is an MD5 hashing methodology.

14. A plaintext information generating system as defined in claim 11 in which the selected characteristic is a ciphertext sequence number.

15. A plaintext information generating system as defined in claim 11 in which the selected characteristic is a time stamp.

16. A plaintext information generating system as defined in claim 11 further including a ciphertext information utilization module configured to utilize the ciphertext.

17. A plaintext information generating system as defined in claim 16 in which the ciphertext information utilization module comprises a message packet receiving module configured to receive a message packet including the ciphertext for transfer over a network and provide the ciphertext in the message packet to the decryption module.

18. A plaintext information generating system as defined in claim 17 in which the message packet is further associated with the selected input value, the message packet receiving module being further configured to provide the associated selected input value to the initialization vector generator.

19. A plaintext information generating system as defined in claim 16 in which the ciphertext information utilization module comprises an information store and a ciphertext retrieval module for retrieving the ciphertext from the information store for provision to the decryption module.

20. A plaintext information generating system as defined in claim 19 in which the initialization vector generator is configured to use a storage address in the information store as the input number.

21. A plaintext information generating system as defined in claim 11 in which the decryption module is further configured to perform a verification operation to verify sensibility of the plaintext.

22. A plaintext information generating system as defined in claim 21 in which the decryption module is configured to perform the verification operation by generating from at least a portion of the plaintext a check value and comparing the check value to a corresponding value associated with the message packet.

23. A plaintext information generating system as defined in claim 22 in which the check value is selected from at least one of a checksum value and a signature value.

24. A plaintext information generating system as defined in claim 21 in which the decryption module is configured to perform the verification operation in connection with a verification methodology selected based on plaintext structure.

25. A plaintext information generating system as defined in claim 24 in which the plaintext is in ASCII text form, the decryption module being configured to perform the verification operation to verify that the plaintext is in ASCII text form.

26. A plaintext information generating system as defined in claim 21 in which the decryption module is configured to perform the verification operation in connection with a verification methodology selected based on application-specific analysis of the plaintext.

27. A plaintext information generating system as defined in claim 21 in which the decryption module is configured to, in performing the verification operation, enable the initialization vector generating module to generate a plurality of initialization vectors each from a respective one of a plurality of input values, the decryption module generating a trial plaintext from each of said initialization vectors and identifying therefrom a verified plaintext based on the sensibility of the trial plaintexts.

28. A plaintext information generating system as defined in claim 21 in which the decryption module is configured to, in performing the verification operation, in a series of iterations, enable the initialization vector generating module to generate an initialization vector, in each iteration using an associated input value, the decryption module generating a trial plaintext using each initialization vector and determining therefrom the sensibility of the trial plaintext generated for the iteration, the series of iterations to continue until a trial plaintext is determined to be sensible, the sensible trial plaintext comprising a verified plaintext.

29. A plaintext information generating system as defined in claim 21 in which the decryption module is configured to, in performing the verification operation, enable the initialization vector generating module to generate a plurality of initialization vectors each from a respective one of a plurality of input values, the decryption module generating a trial plaintext from each of said initialization vectors and providing all of these trial plaintexts with their respective sensibilities.

30. A ciphertext information generating method for generating ciphertext from plaintext, said ciphertext information generating method comprising:
   A. an initialization vector generating step in which an initialization vector is generated from a selected input value using a selected initialization vector generation methodology,
      (i) the selected input value being different for each plaintext and being associated with a selected characteristic of said plaintext,
      (ii) the selected initialization vector generation methodology being selected so that
         (a) a small change of the selected input value will result in a large change in the initialization vector; and
         (b) for any two randomly-selected selected input values, it is unlikely that the corresponding initialization vectors will have the same value; and
   B. an encryption step in which the ciphertext is generated from the plaintext and the initialization vector using a selected encryption methodology and encryption key.

31. A ciphertext information generating method as defined in claim 30 in which the selected initialization vector generation methodology is a hashing methodology.

32. A ciphertext information generating method as defined in claim 31 in which the selected initialization vector generation methodology is an MD5 hashing methodology.

33. A ciphertext information generating method as defined in claim 30 in which the selected characteristic is a ciphertext sequence number.

34. A ciphertext information generating method as defined in claim 30 in which the selected characteristic is a time stamp.

35. A ciphertext information generating method as defined in claim 30 further including a ciphertext information utilization step in which the ciphertext is utilized.

36. A ciphertext information generating method as defined in claim 35 in which the ciphertext information utilization step includes the step of generating a message packet including the ciphertext for transfer over a network.

37. A ciphertext information generating method as defined in claim 36 in which the message packet generating step includes the step of associating the selected input value with the message packet.

38. A ciphertext information generating method as defined in claim 35 in which the ciphertext information utilization step includes the step of storing the ciphertext in an information store.

39. A ciphertext information generating method as defined in claim 38 in which the initialization vector generation step includes the step of using a storage address in the information store as the input number.

40. A plaintext information generating method for generating plaintext from ciphertext, said plaintext information generating method comprising:
   A. an initialization vector generating step in which an initialization vector is generated from a selected input value using a selected initialization vector generation methodology,
      (i) the selected input value being different for each plaintext and being associated with a selected characteristic of said ciphertext, (ii) the selected initialization vector generation methodology being selected so that
(a) a small change of the selected input value will result in a large change in the initialization vector; and
(b) for any two randomly-selected selected input values, it is unlikely that the corresponding initialization vectors will have the same value; and
B. a decryption step in which the plaintext is generated from the ciphertext and the initialization vector using a selected decryption methodology and decryption key.

41. A plaintext information generating method as defined in claim 40 in which the selected initialization vector generation methodology is a hashing methodology.

42. A plaintext information generating method as defined in claim 41 in which the selected initialization vector generation methodology is an MD5 hashing methodology.

43. A plaintext information generating method as defined in claim 40 in which the selected characteristic is a ciphertext sequence number.

44. A plaintext information generating method as defined in claim 40 in which the selected characteristic is a time stamp.

45. A plaintext information generating method as defined in claim 40 further including a plaintext information utilization step for utilizing the plaintext.

46. A plaintext information generating method as defined in claim 45 in which the ciphertext information utilization step includes the step of receiving a message packet including the ciphertext.

47. A plaintext information generating method as defined in claim 46 in which the message packet generating step includes the step of using a selected input value associated with the message packet in the initialization vector generating step.

48. A plaintext information generating method as defined in claim 45 in which the ciphertext information utilization step includes the step of retrieving the ciphertext from an information store for use in the decryption step.

49. A plaintext information generating method as defined in claim 48 in which the initialization vector generation step includes the step of using a storage address in the information store as the input number.

50. A plaintext information generating method as defined in claim 40 in which the decryption step includes the step of performing a verification operation to verify sensibility of the plaintext.

51. A plaintext information generating method as defined in claim 50 in which the decryption step includes the step of performing the verification operation by generating from at least a portion of the plaintext a check value and comparing the check value to a corresponding value associated with the message packet.

52. A plaintext information generating method as defined in claim 51 in which the check value is selected from at least one of a checksum value and a signature value.

53. A plaintext information generating method as defined in claim 50 in which the decryption step includes the step of performing the verification operation in connection with a verification methodology selected based on plaintext structure.

54. A plaintext information generating method as defined in claim 53 in which the plaintext is in ASCII text form, the decryption step including the step of performing the verification operation to verify that the plaintext is in ASCII text form.

55. A plaintext information generating method as defined in claim 50 in which the decryption step includes the step of performing the verification operation in connection with a verification methodology selected based on application-specific analysis of the plaintext.

56. A plaintext information generating method as defined in claim 50 in which the decryption step includes the step of, in performing the verification operation, enabling the initialization vector generating step to be performed to generate a plurality of initialization vectors each from a respective one of a plurality of input values, in the decryption step a trial plaintext being generated from each of said initialization vectors, and a verified plaintext being identified therefrom based on the sensibility of the trial plaintexts.

57. A plaintext information generating method as defined in claim 50 in which the decryption step includes the step of, in performing the verification operation, in a series of iterations, enabling the initialization vector generating step to be performed to generate an initialization vector, in each iteration using an associated input value, the decryption step including the step of generating a trial plaintext using each initialization vector and determining therefrom the sensibility of the trial plaintext generated for the iteration, the series of iterations to continue until a trial plaintext is determined to be sensible, the sensible trial plaintext comprising a verified plaintext.

58. A plaintext information generating method as defined in claim 50 in which the decryption step includes the step of, in performing the verification operation, enabling the initialization vector generating step to generate a plurality of initialization vectors each from a respective one of a plurality of input values, the decryption step including the step of generating a trial plaintext from each of said initialization vectors and providing all of these trial plaintexts with their respective sensibilities.

59. A ciphertext information generation computer program product configured to enable a computer to generate ciphertext from plaintext, said ciphertext information generation computer program product comprising a computer-readable medium having encoded thereon:
A. an initialization vector generator module configured to enable the computer to receive a selected input value and generate an initialization vector therefrom using a selected initialization vector generation methodology,
(i) the selected input value being different for each plaintext and being associated with a selected characteristic of said plaintext,
(ii) the selected initialization vector generation methodology being selected so that
(a) a small change of the selected input value will result in a large change in the initialization vector; and
(b) for any two randomly-selected selected input values, it is unlikely that the corresponding initialization vectors will have the same value; and
B. an encryption module configured enable the computer to generate the ciphertext from the plaintext and the initialization vector using a selected encryption methodology and encryption key.

60. A ciphertext information generation computer program product as defined in claim 59 in which the selected initialization vector generation methodology is a hashing methodology.

61. A ciphertext information generation computer program product as defined in claim 60 in which the selected initialization vector generation methodology is an MD5 hashing methodology.

62. A ciphertext information generation computer program product as defined in claim 59 in which the selected characteristic is a ciphertext sequence number.

63. A ciphertext information generation computer program product as defined in claim 59 in which the selected characteristic is a time stamp.

64. A ciphertext information generation computer program product as defined in claim 59 further including a ciphertext information utilization module configured to enable the computer to utilize the ciphertext.

65. A ciphertext information generation computer program product as defined in claim 64 in which the ciphertext information utilization module comprises a message packet transfer module configured to enable the computer to generate a message packet including the ciphertext for transfer over a network.

66. A ciphertext information generation computer program product as defined in claim 65 in which the message packet transfer module is further configured to enable the computer associate the selected input value with the message packet.

67. A ciphertext information generation computer program product as defined in claim 64 in which the ciphertext information utilization module configured to enable the computer to store the ciphertext on an information store.

68. A ciphertext information generation computer program product as defined in claim 67 in which the initialization vector generator is configured to enable the computer to use a storage address in the information store as the input number.

69. A plaintext information generation computer program product for generating plaintext from ciphertext, said plaintext information generation computer program product comprising:
   A. an initialization vector generator module configured to enable the computer to receive a selected input value and generate an initialization vector therefrom using a selected initialization vector generation methodology,
      (i) the selected input value being different for each plaintext and being associated with a selected characteristic of said ciphertext,
      (ii) the selected initialization vector generation methodology being selected so that
         (a) a small change of the selected input value will result in a large change in the initialization vector; and
         (b) for any two randomly-selected selected input values, it is unlikely that the corresponding initialization vectors will have the same value; and
   B. a decryption module configured to enable the computer to generate the plaintext from the ciphertext and the initialization vector using a selected decryption methodology and decryption key.

70. A plaintext information generation computer program product as defined in claim 69 in which the selected initialization vector generation methodology is a hashing methodology.

71. A plaintext information generation computer program product as defined in claim 70 in which the selected initialization vector generation methodology is an MD5 hashing methodology.

72. A plaintext information generation computer program product as defined in claim 69 in which the selected characteristic is a ciphertext sequence number.

73. A plaintext information generation computer program product as defined in claim 69 in which the selected characteristic is a time stamp.

74. A plaintext information generation computer program product as defined in claim 69 further including a plaintext information utilization module for enabling the computer to utilize the plaintext.

75. A plaintext information generation computer program product as defined in claim 74 in which the ciphertext information utilization module comprises a message packet receiving module configured to enable the computer to receive a message packet including the ciphertext for transfer over a network and provide the ciphertext in the message packet to the decryption module.

76. A plaintext information generation computer program product as defined in claim 75 in which the message packet is further associated with the selected input value, the message packet receiving module being further configured to enable the computer to provide the associated selected input value to the initialization vector generator.

77. A plaintext information generation computer program product as defined in claim 74 in which the ciphertext information utilization module is configured to enable the computer to retrieve the ciphertext information store from an information store and provide the retrieved ciphertext for processing under control of the decryption module.

78. A plaintext information generation computer program product as defined in claim 77 in which the initialization vector generator module is configured to enable the computer to use a storage address in the information store as the input number.

79. A plaintext information generation computer program product as defined in claim 69 in which the decryption module is further configured to enable the computer to perform a verification operation to verify sensibility of the plaintext.

80. A plaintext information generation computer program product as defined in claim 79 in which the decryption module is configured to enable the computer to perform the verification operation by generating from at least a portion of the plaintext a check value and comparing the check value to a corresponding value associated with the message packet.

81. A plaintext information generation computer program product as defined in claim 80 in which the check value is selected from at least one of a checksum value and a signature value.

82. A plaintext information generation computer program product as defined in claim 79 in which the decryption module is configured to enable the computer to perform the verification operation in connection with a verification methodology selected based on plaintext structure.

83. A plaintext information generation computer program product as defined in claim 82 in which the plaintext is in ASCII text form, the decryption module being configured to enable the computer to perform the verification operation to verify that the plaintext is in ASCII text form.

84. A plaintext information generation computer program product as defined in claim 79 in which the decryption module is configured to enable the computer to perform the verification operation in connection with a verification methodology selected based on application-specific analysis of the plaintext.

85. A plaintext information generation computer program product as defined in claim 79 in which the decryption module is configured to enable the computer to, in performing the verification operation, execute the initialization vector generating module to generate a plurality of initialization vectors each from a respective one of a plurality of input values, the decryption module enabling the computer to generate a trial plaintext from each of said initialization vectors and identify therefrom a verified plaintext based on the sensibility of the trial plaintexts.

86. A plaintext information generation computer program product as defined in claim 79 in which the decryption module is configured to enable the computer to, in performing the verification operation, in a series of iterations, enable the initialization vector generating module to generate an initialization vector, in each iteration using an associated input value, the decryption module enabling the computer to generate a trial plaintext using each initialization vector and determine therefrom the sensibility of the trial plaintext generated for the iteration, the series of iterations to continue until a trial plaintext is determined to be sensible, the sensible trial plaintext comprising a verified plaintext.

87. A plaintext information generation computer program product as defined in claim 79 in which the decryption module is configured to enable the computer to, in performing the verification operation, process the initialization vector generating module to generate a plurality of initialization vectors each from a respective one of a plurality of input values, the decryption module enabling the computer to generate a trial plaintext from each of said initialization vectors and providing all of these trial plaintexts with their respective sensibilities.

* * * * *